United States Patent [19]

Sielsch

[11] 3,808,372

[45] Apr. 30, 1974

[54] AUTOMATIC TIMEKEEPING AND RECORDER UNIT

[75] Inventor: Leo A. Sielsch, Hollywood, Calif.

[73] Assignee: Chronometrics, Inc., Los Angeles, Calif.

[22] Filed: Nov. 3, 1972

[21] Appl. No.: 303,522

[52] U.S. Cl.. 179/6 E, 179/100.1 DR, 179/100.2 S, 179/100.2 MD

[51] Int. Cl.. G11b 15/18, G11b 19/06, G11b 27/14

[58] Field of Search ........... 179/100.2 S, 100.2 MD, 179/100.2 Z, 100.1 DR, 100.2 B, 6 E; 340/174.1 H, 174.1 C

[56] References Cited

UNITED STATES PATENTS

| | | | |
|---|---|---|---|
| 3,728,494 | 4/1973 | Kobler | 179/100.2 S |
| 3,623,039 | 11/1971 | Barham | 179/100.2 S |
| 3,725,589 | 4/1973 | Golden | 179/100.1 DR |
| 3,499,993 | 3/1970 | Owen et al. | 179/100.2 S |
| 3,671,683 | 6/1972 | Rahenkamp et al. | 179/100.2 S |
| 3,541,271 | 11/1970 | Joslow et al. | 179/100.2 S |

*Primary Examiner*—Stanley M. Urynowicz, Jr.
*Assistant Examiner*—Alfred H. Eddleman
*Attorney, Agent, or Firm*—Jessup & Beecher

[57] ABSTRACT

An automatic portable timekeeping and recorder unit is provided for professional persons such as lawyers, engineers, accountants, and the like. The unit includes a magnetic tape recorder for recording details of a particular transaction being timed, and it also includes elapsed time circuitry for recording the time of the transaction. The unit also includes a telephone interrupt circuit for permitting telephone calls received or made during the recording and timing of any particular transaction to be independently timed and recorded.

5 Claims, 4 Drawing Figures

AUTOMATIC TIMEKEEPING AND RECORDER UNIT

BACKGROUND OF THE INVENTION

A primary function of the unit of the invention is to provide a convenient mechanism for a professional person to keep track of the time spent in various tasks so that appropriate billing may be made to the clients. The unit of the invention serves to time, identify and record on a magnetic tape, a person's daily activities. The magnetic tape may be subsequently transcribed and the resultant data utilized for billing and other purposes. For example, in addition to billing, the data may be used for productivity analysis, cost control, travel time, activity report preparation, and a multiplicity of other uses.

The embodiment of the invention to be described in detail herein includes a magnetic tape recorder which is activated when a "record" button is depressed, and which is de-activated when the "record" button is released. The magnetic tape in the recorder is contained in a cartridge which may be easily inserted into or removed from the recorder.

The unit to be described also includes a main elapsed time circuit which generates regularly timed pulses when it is activated by the actuation of a "start" button, and which includes a pulse counter circuit which counts the pulses. When the "record" button is depressed, the count on the counter, which typically may take the form of a multi-bit binary number, is recorded. At the same time, the main elapsed time circuit is deactivated and the counter is cleared to zero.

A telephone elapsed time circuit is also included in the unit, and it is activated automatically upon the initiation or receipt of a telephone call. The activation of the telephone elapsed time circuit suspends operation of the main elapsed time circuit, but it does not affect the count in its counter. Depression of the "record" button causes the count on the counter included in the telephone elapsed time circuit to be recorded. Release of the "record" button de-activates the telephone elapsed time circuit and clears its counter. The latter release of the "record" button also re-activates the main elapsed time circuit so that the timing of the interrupted activity may be resumed.

Audio circuitry is also included in the unit so that information may be recorded concerning each timed transaction and concerning each interrupting telephone call. The embodiment of the invention to be described is portable and battery powered for direct current operation, so that it may be carried about, for example, in a briefcase. The unit preferably has an alternating current charging capability, so that the batteries may be charged at any time merely by plugging the unit into any available alternating current main.

DETAILED DESCRIPTION OF THE ILLUSTRATED EMBODIMENT

Figure 1:
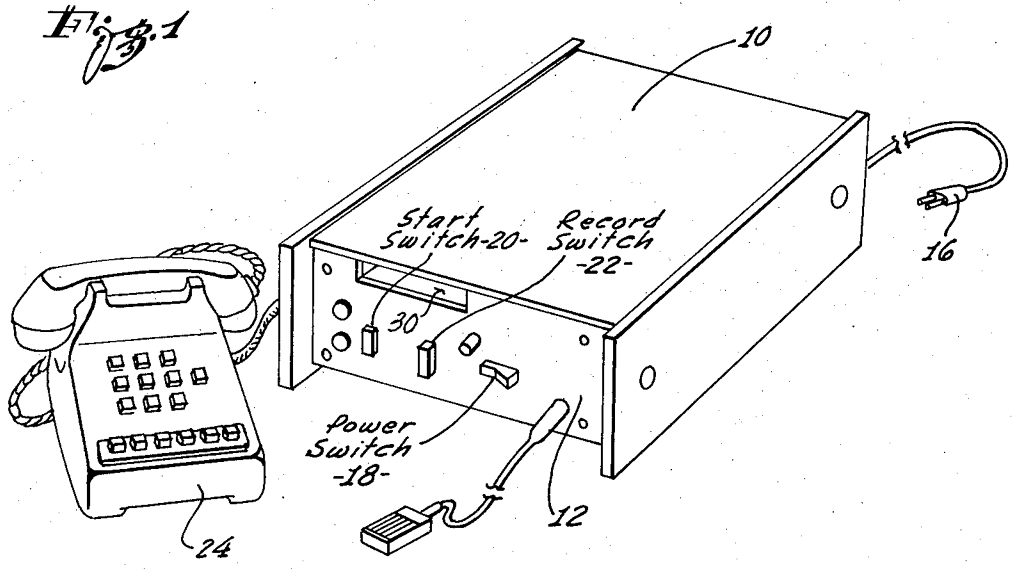
FIG. 1 is a representation of a unit which may be constructed to incorporate the concepts of the invention

The unit of the invention may take the form shown in FIG. 1. Specifically, the unit may include a casing and having a front panel 12. A microphone 14 may be plugged into the front panel, and the batteries within the unit may be charged, for example, by plugging a cord 16 into any appropriate A.C. main. The unit is energized by turning on a power switch 18. The timing interval of any transaction is started by depressing a start switch 20; and the timed interval and associated audio information are recorded when a record switch 22 is depressed. A telephone 24 is connected to the unit, and it interrupts a timing cycle in the unit automatically whenever it is operated, as will be described.

Figure 1A:
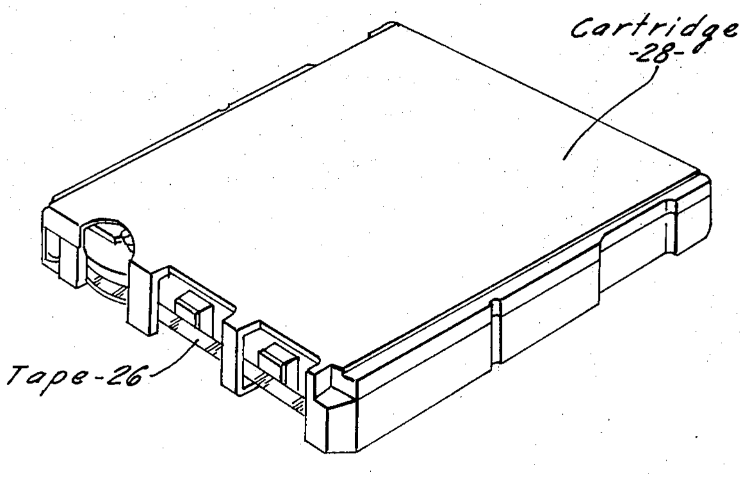
FIG. 1A shows a typical cassette type cartridge which may be plugged into the unit of FIG. 1.

The information processed by the unit of the invention is recorded, for example, on a magnetic tape 26 which may be contained in a cassette type cartridge 28 (FIG. 1A). The cartridge fits into a slot 30 in the front panel 12 of the unit.

Figure 2:
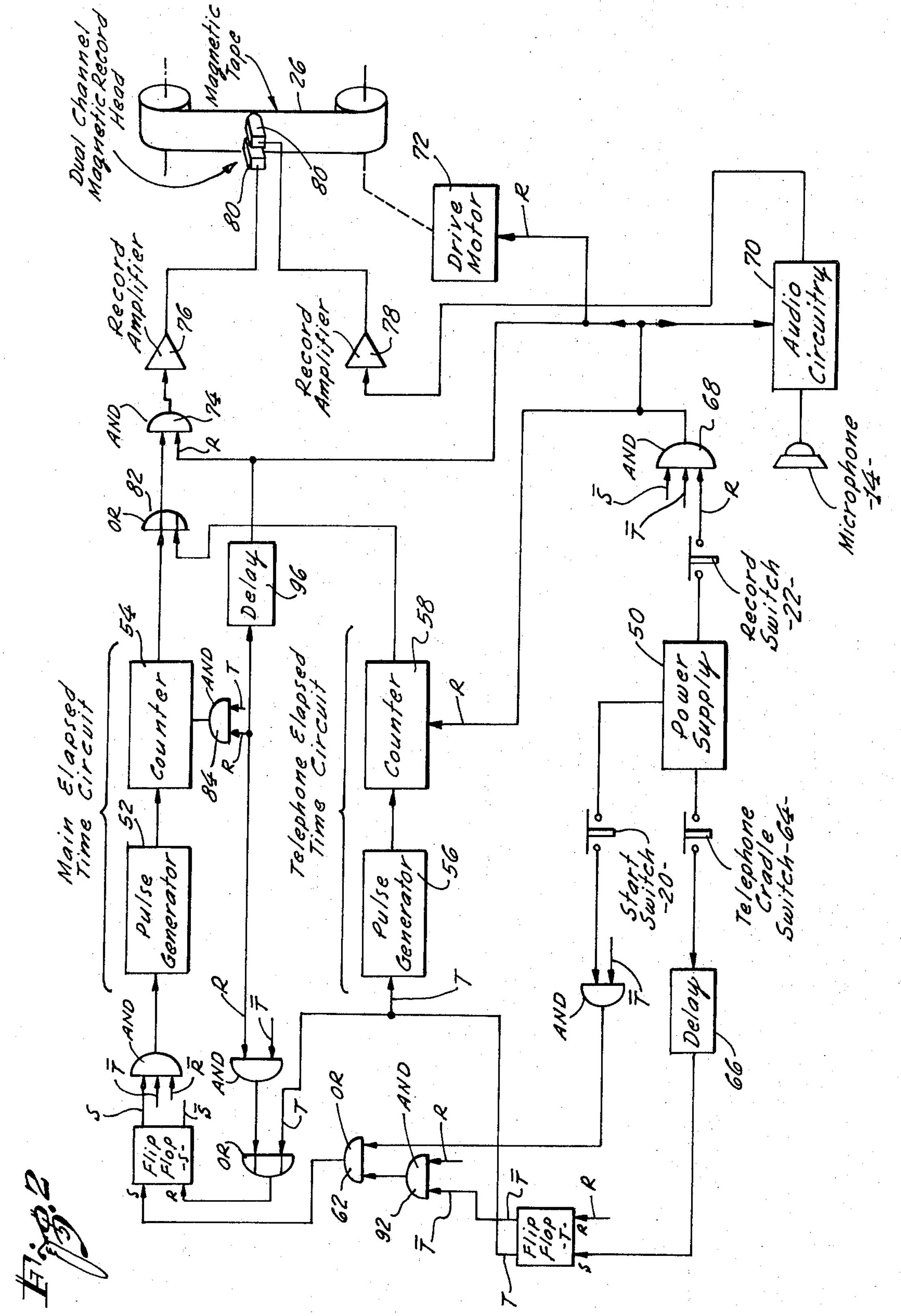
FIG. 2 is a logic diagram of one embodiment of the invention.

The electronic circuit of the unit is shown in FIG. 2. The circuit is powered by a power supply 50 which may, for example, be in the form of rechargeable batteries, as explained above. The unit includes a main elapsed time circuit which is made up of a pulse generator 52 and a counter 54. The unit also includes a telephone elapsed time circuit which is made up of a pulse generator 56 and a counter 58.

Since the circuit details of the power supply 50, as well as of the pulse generators 52 and 56 and counters 54 and 58 are well known to the art, it is believed unnecessary to encumber the present record with a detailed description of such circuitry. Moreover, the logic elements such as "or" gates, "and" gates, flip-flops, and amplifiers, also shown in block form in the diagram of FIG. 2, are believed to be sufficiently well known to the art so as to obviate any need to show and describe these elements in circuit detail.

The start switch 20 connects the power supply 50 to an "and" gate 60 which, in turn, is connected through an "or" gate 62 to the set input terminal of a flip-flop designated S. A telephone cradle switch 64, which is operated each time the hand-set of the telephone 24 is removed from the base, is connected through a delay line 66 to the set input terminal of a flip-flop designated T. The flip-flop S develops output terms S and $\overline{S}$, whereas the flip-flop T develops output terms T and $\overline{T}$, in each case depending upon the set or reset condition of the individual flip-flop.

The power supply 50 is also connected through the record switch 22 to an "and" gate 68, which in turn, is connected to appropriate audio circuitry designated by the block 70, to a drive motor 72 for the magnetic tape 26, and to an "and" gate 74. The "and" gate 74 is connected to a record amplifier 76, whereas the audio circuitry 70 is connected to a record amplifier 78. The record amplifiers 76 and 78 are coupled to the magnetic tape 26 through a dual channel magnetic record head 80. The information from the record amplifier 76 is recorded on one channel of the tape 26, whereas the audio information from the record amplifier 78 is recorded on a second channel.

The counter 54 and counter 58 are connected through an "or" gate 82 to the "and" gate 74. The "and" gate 68 develops an output term R which is introduced to the audio circuitry 70 and to the "and"

gate 74, and also to an "and" gate 84. The term T is also applied to the "and" gate 84.

The set output terminal S of the flip-flop S is connected to an "and" gate 86 which, in turn, is connected to the pulse generator 52. The set output terminal T of the flip-flop T is connected to the pulse generator 56 and through an "or" gate 88 to the reset input terminal of the flip-flop S. An "and" gate 90 is also connected to the "or" gate 88, the terms R and $\overline{T}$ being applied to the "and" gate 90. The reset output terminal $\overline{T}$ of the flip-flop T is connected to an "and" gate 92, and the term R is also applied to that "and" gate. The "and" gate 92 is also connected to the "or" gate 62.

When the operator wishes to time any particular activity, he merely pushes the start switch 20. Then, so long as the telephone cradle switch 64 is not closed by lifting the hand-set off the base, the "and" gate 60 is enabled, so that the flip-flop S may be set. Then so long as the record switch 22 is not being operated and the telephone cradle switch 64 is still open, the "and" gate 86 is enabled, and the pulse generator 52 is activated. The pulse generator 52 now generates regularly timed pulses, and these are counted by the counter 54. The count continues until the operator presses the record switch 22.

When the record switch 22 is depressed, and so long as the telephone cradle switch 64 and start switch 20 are open, the "and" gate 68 is enabled, and the term R is generated to enable the "and" gate 74, and to activate the audio circuitry 70. The count on the counter 54 is immediately recorded through the record amplifier 76, and an accompanying audio message may be recorded by the microphone 14, and through the audio circuitry 70 and record amplifier 78.

After a slight delay provided by a delay line 96, the counter 54 is cleared to zero, and the flip-flop S is reset to stop the pulse generator 52. The particular transaction has now been recorded, and the time interval of that transaction is also recorded. The system is now in condition to time the next transaction, and this may be achieved by repeating the operations described above.

If during the timing of any particular activity, the hand-set of the telephone 24 is lifted off the base, the telephone cradle switch 64 closes, and after a 6 second delay, for example, provided by the delay line 66, the flip-flop T is set. The setting of the flip-flop T immediately resets the flip-flop S so as to stop the pulse generator 52 in the main elapsed time circuit, and to activate the pulse generator 56 in the telephone elapsed time circuit. The pulse generator 56 now starts to generate regularly timed pulses, and these pulses are counted by the counter 58. During this interval the counter 54 in the main elapsed time circuit is not returned to zero, and it acts as a memory for the already accumulated timing for the activity being monitored before the telephone was operated.

At the termination of the telephone conversation, the handset is again replaced on the base, and the telephone cradle switch 64 is opened. The record switch 22 is depressed, so that the accumulated time in the counter 58 may be recorded. Details concerning the phone conversation may also be recorded while the record switch 22 is depressed, by operating the microphone 14, as described above. Also, it should be pointed out that whenever the record switch 22 is operated to cause the "and" gate 68 to generate the term R, the drive motor 72 drives the magnetic tape 26. At other times, the magnetic tape is at rest.

As soon as the record switch 22 is released at the end of a telephone interruption, the flip-flop S is again set through the "and" gate 92, so that the pulse generator 52 is again activated, and the counter 54 resumes its count. The previous timed activity is then resumed, and the recording operation at the end of that timed activity causes the actual time spent at that activity to be recorded, in addition to the details concerning all interrupting telephone calls.

Figure 3:
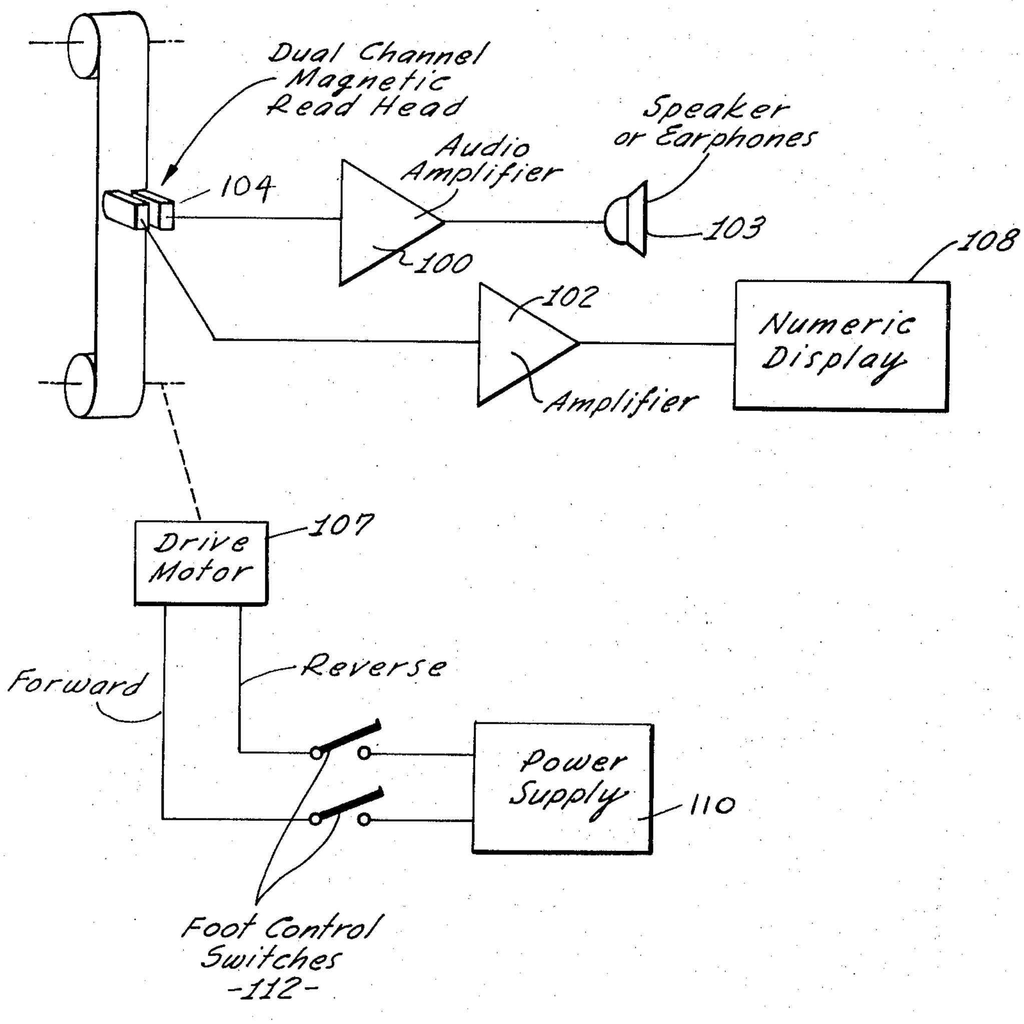
FIG. 3 is a logic diagram of a transcriber which may be used in conjunction with the equipment for transcribing the information on its magnetic tape.

The cartridge 28 may be removed, and the information on the magnetic tape 26 transcribed in a system such as shown in FIG. 3. The information on the two channels on the tape is picked up by an audio amplifier 100 and amplifier 102. These two amplifiers are coupled to the tape 26 through a dual channel magnetic read head represented by the symbol 104.

The audio information on the tape concerning each transaction and each telephone call is transcribed by a typist, as the information is received through a speaker or ear plug 103. The count information concerning each transaction is displayed, as read, on an appropriate numeric display 108, so that the transcriber can also type the times of the various transactions.

The tape 26 may be operated in any typical tape reproducing system, and is driven by a drive motor 107. The drive motor is connected to an appropriate power supply 110 through forward and reverse foot control switches 112, so as to facilitate the transcription of the information on the tape.

The invention provides, therefore, a simple system whereby transactions may be appropriately timed, and information concerning the transactions may be recorded. It will be appreciated that while a particular embodiment has been shown and described, modifications may be made. It is intended in the claims to cover all modifications which come within the scope of the invention.

What is claimed is:

1. An automatic timekeeping and recorder unit including a recorder for recording information on an associated recording medium; an audio circuit coupled to said recorder for recording audio information on said recording medium; a first elapsed time circuit including a pulse generator and a pulse counter for producing an output representative of the time interval of activation thereof; a first control circuit connected to said first elapsed time circuit and including a manually operated switch for activating said first elapsed time circuit to cause said pulse generator to introduce pulses to said pulse counter; and a second control circuit connected to said first elapsed time circuit and to said recorder and including a second manually operated switch for causing the output of said counter in said first elapsed time circuit to be recorded on said recording medium and to reset the counter and deactivate said first elapsed time circuit.

2. The automatic timekeeping and recorder unit defined in claim 1, in which said recorder is a magnetic recorder including a removable cartridge for said recording medium, and in which said recording medium is a magnetic tape.

3. The automatic timekeeping and recording unit defined in claim 1, and which includes a second elapsed time circuit including a pulse generator and a pulse counter for producing an output representative of the time interval of activation thereof; a third control circuit including a telephone-operated switch for activating said second elapsed time circuit when said telephone-operated switch is actuated to cause said pulse generator therein to introduce pulses to the pulse counter therein; and a fourth control circuit connected to said second elapsed time circuit and to said recorder for causing the output of the pulse generator in said second elapsed time circuit to be recorded on said recording medium and to de-activate said second elapsed time circuit and reset the pulse generator therein when the second switch is operated.

4. The automatic timekeeping and recorder unit defined in claim 3, in which said third control circuit includes circuitry connected to said first elapsed time circuit for de-activating the pulse generator in said first elapsed time circuit when said second elapsed time circuit is activated.

5. The automatic timekeeping and recorder unit defined in claim 4, in which said fourth control circuit includes circuitry connected to said first elapsed time circuit for re-activating the pulse generator in said first elapsed time circuit when said second elpased time circuit is de-activated.

* * * * *